2,703,782

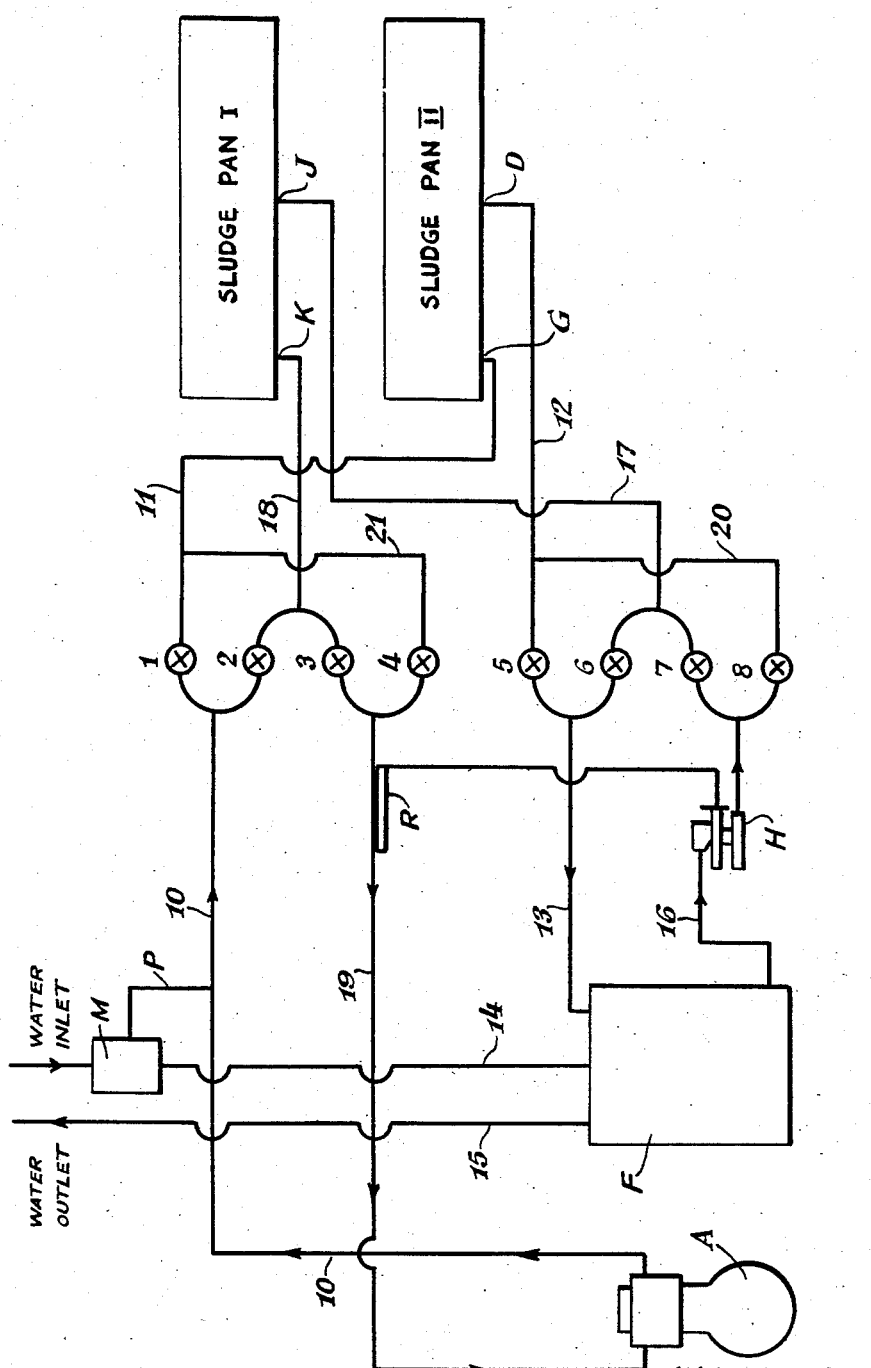

TREATMENT OF SLUDGES

Colston James Regan, Brighton, Richard John Stephenson, Ilford, and George Stephen Clements, Bexley, England, assignors to London County Council, London, England, a British Municipal Authority of County Hall Application December 10, 1949, Serial No. 132,234

Claims priority, application Great Britain December 11, 1948

5 Claims. (Cl. 210—2)

The invention relates to the treatment of sludges of all kinds containing colloidal or cellular organic matter in aqueous medium, and particularly to all types of sewage sludge, including primary and secondary sedimentation sludges, digested sludges and activated sludges, for their de-watering.

The greatest problem connected with the treatment of sewage is the settlement, filtration and drying of the sludges, and the disposal of the dried sludge. The settlement, filtration and drying of the sludges is generally a long and tedious operation in the process of the treatment.

The invention has among its objects to provide for the filtration from an aqueous medium of particles which can be caused to settle only with difficulty and are so fine as to clog the pores of the filter.

The invention has also among its objects to provide a process for the treatment of sludge, particularly sewage sludges, in which the settlement and filtrability is greatly accelerated, the time of settlement of the solids in the sludges being shortened and the rate of filtering increased with a resultant decrease in the cost of disposal, and a dried product obtained which has considerable utility as a fertiliser.

According to the invention, sludges, particularly sewage sludges, are completely frozen and then permitted to thaw and are then settled and/or filtered.

According to the invention furthermore, chemicals such as chlorine and/or compounds such as salts of the divalent tor trivalent metals, including those of iron and aluminium, may be added to the sludges before or after freezing, each being used either alone or in admixture.

According to the invention, the apparatus for carrying out the process utilises the latent heat of fusion of ice to effect the alternate refrigeration and thawing of the sludge under treatment.

According to the invention furthermore, the refrigeration apparatus is so constructed that part of the energy required to thaw one charge of sludge frozen according to the process of the invention is abstracted from another equivalent charge of sludge which is thus frozen, the operation being reversed after the thawed sludge has been removed and replaced by a fresh charge.

According to the invention furthermore, a convenient type of refrigerating apparatus may be used for the freezing of the sludges, the apparatus consisting essentially of a compressor, an evaporator, a condenser and an expansion valve, and means whereby the action of the refrigerating apparatus may be reversed, whereby the condenser before reversal functions as the evaporator after reversal and vice versa. Any suitable substance may be used as the refrigerant, the condenser and the evaporator coils being in separate containers each containing sludge to be treated and the latent heat of fusion of ice then being used to thaw and heat the sludges in each container alternately.

By the process of the invention, the rate of concentration of solids in the sludge is increased, the time required to filter the settled sludge is greatly reduced, and the sludge when filtered produces a filter cake of low water content, of a granular structure and of a friable nature, which readily responds to further drying.

Experiments have shown that the process of the invention is applicable to the treatment of sludges, particularly sewage sludges, whether from primary and secondary sedimentation systems, from a sludge digestion plant or from an activated sludge plant. In all cases, there is greatly accelerated settlement of the solid matter in the sludge. As a comparison, in the case of digested and activated sludges, settlement to about 40% of the original volume is, according to the process of the invention, effected in less than one hour, while generally the untreated sludges or sludges treated in known processes were virtually unsettleable except after long periods.

Furthermore, experiments show that the filtrability of the sludges without the addition of chemicals, is as a result of the process of the invention, greatly enhanced, filtration occupying only about one-fifth of the time generally required for untreated sludges or sludges treated according to known processes. With the addition of suitable amounts of selected chemicals, singly or in admixture, to the sludge before freezing, the rate of vacuum filtration may be very greatly increased as compared with the rates obtained by normal good practice in the use of sludges treated according to processes generally used. Examples of suitable chemicals for this purpose are ferric compounds, chlorinated ferrous sulphate, aluminium compounds and chlorine.

It has been particularly noted that sludges treated in accordance with the process of the invention are much more friable than dried sludges obtained in the normal manner. In all cases, it was found that sludges treated according to the process of the invention responded well to vacuum filtration.

As a result of experiment, it has been found that filtration of digested sludge, chemically treated and frozen according to the process of the invention, consistently gave, on vacuum filtration through a flannel filter cloth, filter cakes containing well over 20% solids, and in some cases, at rates higher than 300 lbs./sq. ft./hr. dry solids.

Experiments were carried out on the filtrability of digested sludges treated according to the process of the invention with chemicals on a gravity sand filter of about ¼ square foot area and made up of 1" of builders' sand over about 1" of granite road chippings. In one experiment the filter cake produced could easily have been removed after 20 minutes representing an output of 9 lbs./sq. ft./hr., but it was actually removed as a cake of 24.8% solids after 30 minutes, that is, at 6 lbs./sq. ft./hr.

Similarly, it has been found that activated sludge after chemical treatment and freezing according to the process of the invention filters more easily. Experiments carried out with the activated sludge treated with 1000 parts of ferric iron per million parts of wet sludge in the process of the invention resulted in the production of dry solids at rates up to 52 lbs./sq. ft./hr. by vacuum filtration. In a typical case using vacuum filtration 80% of the liquid was extracted from a sludge previously settled to 40% by freezing, in one minute.

In the experiments, some results of which are hereinafter given in Tables 1, 2 and 3, filter cakes from all types of sewage sludge were obtained by the use of a Buchner funnel of 2¾" diameter with a disc or fine wool flannel as a filter cloth. The results obtained by such a filter have been shown by experiment to be strictly comparable with those obtained on a Dorr-Oliver type vacuum filter when used for the filtration of iron-conditioned sludges. The area of the filter was approximately 1/24 square foot and a suction of 25" of mercury was employed. The digested sludge filter cake was usually about ⅜" thick, and very easily dried and friable. The solids content was usually of the order of 22% to 30%. In the case of an activated sludge the solids content was usually in the range 14–22%, and with primary sedimentation sludge the solids content was usually in the range 25–30%.

It was noted that the rate of filter cake production was dependent on the chemical dosage.

The sludge filter cakes produced after filtration according to the process of the invention, are readily air-dried and differ from filter cakes produced according to processes in general use, which are of tough and gelatinous character.

Digested sludges treated according to the invention are on drying, easily crumbled between the fingers, and the activated sludges although harder, are readily ground, and resemble inorganic material in this respect rather than normal dried sludges.

Experiments have been carried out with respect to the chemicals used in the process of the invention. It has been found that an improvement in the filtrability of the sludge treated generally increases up to the highest concentration of chemicals so far employed, except in the case of chlorine which is effective up to values within the range 500–1000 parts chlorine per million parts of sludge. The greatest acceleration of filtration, particularly with digested sludges, is generally obtained by the use of aluminium sulphate.

It has been found that with respect to the chemicals used a dose of chlorine of 1000 parts per million is about as effective as a dose of ferric iron (supplied as chlorinated copperas) of 500 parts per million. To produce an amount of chlorinated copperas of 500 parts per million would require about 1.6 tons of chlorine in dealing with 5,000 tons of sludge. 100 parts of chlorine per million—5 tons of chlorine to treat 5,000 tons of sludge—appears to achieve the same result. Thus, for the chemical dosages given in the earlier part of the paragraph the use of iron as a chemical may be obviated altogether by the use of about three times the amount of chlorine required to prepare chlorinated copperas. It may be reasonably anticipated that if the use of iron could be dispensed with, no harmful effects could be expected from the use of sludge treated according to the process of the invention, with chlorine, for agricultural purposes.

The use of chlorine gas for the conditioning of sludges before freezing also recommends itself by reason of the relative cheapness of the gas, its availability and the ease by which it is handled. With the use of chlorine gas in the proportion of 1000 parts to one million parts of digested sludge, the maximum rate of filtration was of the order of 40 lbs./sq. ft./hr. of dry solids. The filter cakes with chlorine were somewhat wetter and less granular than the cakes obtained with aluminium sulphate or with chlorinated copperas. The final settlement after thawing of sludges conditioned with chlorine gas was of the same order as with iron and aluminium compounds, but in its initial stages, although still rapid, settlement was slower with chlorine than with the iron and aluminium compounds.

Experiments in respect of the minimum effective chemical doses of chlorinated copperas and of chlorine according to the invention showed that there was a substantial result from the use of 100 parts ferric iron per million and an appreciable result at 50 parts per million. In the case of chlorine between 100 and 200 parts per million would appear to be the threshold value for effective action. By increasing the chemical dosage the results are improved. The highest chemical dosage used gave the best result.

It has been found that in using $Al_2(SO_4)_3$ 20 parts per million is effective.

Freezing the sludge, without the addition of chemicals in accordance with the process of the invention, greatly accelerates settlement; in the case of digested sludges, settlement to 45% of the initial volume in one hour is usually obtained with virtually no settlement in one hour if the sludge is unfrozen. In the case of activated sludges, settlement is consistently up to about 45% in one hour. It was found that addition of chemicals accelerated the early stages of settlement, but did not always improve the ultimate one hour's settlement figure.

It is according to the invention, preferred to add the chemicals before freezing and as late as possible before the sludge begins to freeze, with as effective mixing in the bulk as possible.

It is to be noted that it is essential according to the process of the invention, to freeze the sludges completely, cooling to 0° C. without freezing having a negligible effect.

It has been found with respect to the freezing time that the best results have been obtained with periods above 20 minutes, though the treatment is effective with periods as low as 5 minutes. There appears to be little importance in the period for which the sludge is kept frozen after freezing.

With digested sludges treated according to the process of the invention without chemicals, the production of dry solids was low—1.2 to 7 lbs./sq. ft./hr. The addition of chemicals greatly increased the filtrability of the digested sludge, and with 200 parts of ferric iron to one million, dry solids production ranged from 6 to 30 lbs./sq. ft./hr. Higher doses of iron of 1000 per million gave solids production figures up to 132 lbs./sq. ft./hr., and with 100 parts of chlorine per million an output of 39.4 lbs./sq. ft./hr. was obtained.

With digested sludges, treated with aluminium sulphate and frozen according to the process of the invention, the addition of 100 parts of aluminium per million parts of wet sludge gave a dry solids output of between 50 and 60 lbs./sq. ft./hr. Larger doses of aluminium sulphate gave much higher outputs of dry solids, 1000 parts of aluminium per million parts of wet sludge giving dry solids outputs of over 300 lbs./sq. ft./hr.

The highest outputs of dry solids were obtained by the use of chlorinated copperas and aluminium sulphate. The highest dosages of ferric iron so far used represent about 0.3% calculated as ferric chlorine of the weight of the dry solids produced. The highest dosages of aluminium so far used represent about 0.35% calculated as aluminium sulphate, of the weight of the dry solids produced. With these dosages, filtration under a vacuum of about 20" of mercury, was effected in a few seconds with phenomenal dry solids outputs such as 350 lbs./sq. ft./hr. in the case of both the ferric iron and the aluminium. These solids were deposited as friable and granular cake of about ⅜" thickness having a solids content of about 30%. Such outputs are of the order of 100 times of outputs from iron-conditioned sludges treated in the normal manner.

As was expected, the yield of filter cake from activated sludge was less than that obtained from the digested sludge, but outputs up to 52 lbs./sq. ft./hr. have been obtained in the use of iron. The figures are approximate as the time to produce a cake of the standard thickness, namely about ⅜" has to be measured in seconds.

Examinations of the supernatant fluid from a digested sludge treated according to the process of the invention show that the oxygen demand is comparable with that from a normal digested sludge after a secondary treatment according to known methods for a week or more.

There is a rapid settlement upon the thawing of frozen chemically-conditioned sludges. Under the best conditions, settlement occurs down to 40% of the sludge in 15 minutes. About 50% by volume of the material may thus be removed as supernatant liquid shortly after thawing. This supernatant liquid has an oxygen demand from permanganate in 4 hours at 80° F. of about 160 to 350 parts per million, and is, from the point of view of pollution, much less noxious than most sludge liquors. In no case was an unfiltered supernatant more than about 3 or 4 times as strong as sewage.

The filtrates obtained on vacuum filtration were of a slightly less polluting character than the supernatant liquids.

It was found that the activity of the activated sludges was not destroyed in the use of the process of the invention, although it was somewhat reduced.

The following Tables 1, 2 and 3 show the effect of prior freezing and thawing on the settlement and filtration of sewage sludges which had been chemically conditioned before freezing. For the purposes of comparison, Tables 1, 2 and 3 contain the results upon settlement and filtration of sludges treated as follows:

(1) No chemicals added to the sludge and sludge not frozen.

(2) Chemicals added to the sludge but sludge not frozen.

(3) No chemicals added but sludge frozen.

(4) Sludge frozen after the addition of varying amounts of chemicals.

The conditioning chemicals employed, namely chlorine gas, chlorinated ferrous sulphate and aluminium sulphate were each added after the sludge had been cooled almost to freezing point. In every instance in which the sludges were frozen, they were kept frozen for about 30 minutes.

The settlement data in the tables were obtained at intervals up to 60 minutes from the time that the sludge had completely thawed. Within 60 minutes of thawing and before filtration as much as possible of the supernatant liquid was decanted from the sludge. The oxygen demand of this decanted supernatant is given in the last column of the three tables. 60 minutes after the thawing of the frozen sludge and after the greater part of the supernatant liquid had been decanted, the settled sludge was filtered, under a suction of 25" of mercury, through the Büchner funnel hereinbefore described.

Table 1 relates to digested sludge, Table 2 to activated sludge, and Table 3 to primary sedimentation sludge.

The following Table 4, which relates to digested sludges treated according to the process of the invention, gives data similar to that given in Tables 1, 2 and 3, but in this instance the sludges were frozen in the refrigerating apparatus hereinafter described. The settled sludge was filtered under a vacuum of 20" of mercury. The filtering apparatus used was, in effect, a combined filter-flask and Büchner funnel and was made from flanged piping

TABLE 1
*Digested sludge*

| Method of Treatment of Sludge | Chemical used | Concentration of chemical | | Settlement, percent volume occupied by sludge | | | | | Filtration time | Filtration | | | Oxygen absorbed from KMnO₄ in 4 hrs. at 80° F. by decanted supernatant in p. p. m. |
| | | | | Minutes | | | | | | Filter Cake | | Rate | |
| | | p. p. m. | Estimated as— | 5 | 10 | 15 | 30 | 60 | | Thickness inches | Percent Content of dry solids | lbs./sq. ft./hr. of dry solids | |
|---|---|---|---|---|---|---|---|---|---|---|---|---|---|
| No treatment | None | | | 100 | 100 | 100 | 100 | 99 | Over 120 min. | | | | |
| Chemicals only | Chlorinated ferrous sulphate. | 200 | Fe''' | 100 | 100 | 100 | 100 | 99 | 60 min | | 17.1 | 0.3 | |
| Freezing only | None | | | 96 | 93 | 88 | 72 | 60 | 30 min | 5/16 | 23.3 | 1.2 | |
| Freezing + Chemical | Chlorinated ferrous sulphate. | 200 | Fe''' | 60 | 51 | 49 | 46 | 45 | 6 min | 5/16 | 32.3 | 6.0 | |
| Do | do | 500 | Fe''' | 49 | 47 | 46 | 45 | 44 | 40 sec | 1/4 | 30.6 | 49.5 | 176 |
| Do | do | 1,000 | Fe''' | 50 | 49 | 48 | 48 | 47 | 15 sec | 1/4 | 29.3 | 132 | 131 |
| Do | Chlorine gas | 100 | Cl | 74 | 58 | 52 | 49 | 47 | 10 min | 3/8 | 18.2 | 3.2 | 405 |
| Do | do | 200 | Cl | 60 | 55 | 52 | 49 | 48 | 5 min | 3/8 | 21.7 | 6.5 | |
| Do | do | 500 | Cl | 68 | 52 | 50 | 47 | 46 | 3 min | 5/16 | 23.0 | 13.1 | 364 |
| Do | do | 1,000 | Cl | 67 | 51 | 48 | 45 | 44 | 1 min | 5/16 | 25.1 | 39.4 | 315 |
| Chemicals only | Aluminium sulphate. | 1,000 | Al | 100 | 100 | 100 | 100 | 95 | 15 min | | 22.6 | 1.1 | 248 |
| Freezing + Chemical | do | 100 | Al | 59 | 51 | 49 | 48 | 47 | 30 sec | 5/16 | 31.6 | 57 | 152 |
| Do | do | 200 | Al | 62 | 54 | 52 | 50 | 49 | 10 sec | 5/16 | 32.6 | 171 | 135 |
| Do | do | 500 | Al | 60 | 55 | 54 | 52 | 52 | do | 5/16 | 30.4 | 171 | 92 |
| Do | do | 1,000 | Al | 60 | 59 | 58 | 57 | 57 | <5 sec | 5/16 | 34.7 | >342 | 72 |

TABLE 2
*Activated sludge*

| Method of Treatment of Sludge | Chemical Used | Concentration of chemical | | Settlement, percent volume occupied by sludge | | | | | Filtration Time | Filtration | | | Oxygen absorbed from KMnO₄ in 4 hrs. at 80° F. by decanted supernatant in p. p. m. |
| | | | | Minutes | | | | | | Filter Cake | | Rate | |
| | | p. p. m. | Estimated as— | 5 | 10 | 15 | 30 | 60 | | Thickness, Inches | Percent content of dry solids | lbs./sq. ft./hr. of dry solids | |
|---|---|---|---|---|---|---|---|---|---|---|---|---|---|
| None | None | | Fe''' | | 100 | 100 | 100 | 99 | 10 min | | 7.2 | 0.43 | |
| Chemicals only | Chlorinated ferrous sulphate. | 200 | Fe''' | | 100 | 100 | 100 | 99 | do | 1/8 | 10.6 | 0.43 | |
| Freezing only | None | | Fe''' | | | 75 | 54 | 43 | 4 min | 1/8 | 11.8 | 2.17 | 151 |
| Freezing+Chemical | Chlorinated ferrous sulphate. | 100 | Fe''' | | | 53 | 44 | 41 | 2 min | 1/8 | 13.0 | 4.32 | 138 |
| Do | do | 200 | Fe''' | | | 70 | 52 | 45 | 1 min | 1/8 | 14.6 | 8.76 | 128 |
| Do | do | 1,000 | Fe''' | | | | | | 7 sec | 1/16 to 1/8 | 22.5 | 52 | |
| Do | Chlorine gas | 500 | Cl | 61 | 43 | 37 | 30 | 27 | 3 min | 1/8 | 14.6 | 4.4 | 169 |

TABLE 3
*Primary sedimentation sludge*

| Method of Treatment of Sludge | Chemical used | Concentration of chemical | | Settlement, percent volume occupied by sludge | | | | | Filtration Time | Filtration | | | Oxygen absorbed from KMnO₄ in 4 hrs. at 80° F. by decanted supernatant in p. p. m. |
| | | | | Minutes | | | | | | Filter Cake | | Rate | |
| | | p. p. m. | Estimated as— | 5 | 10 | 15 | 30 | 60 | | Thickness, Inches | Percent Content of dry solids | lbs./sq. ft. of dry solids | |
|---|---|---|---|---|---|---|---|---|---|---|---|---|---|
| None | None | | | 100 | 100 | 100 | 100 | 100 | 1 hr | | 29.2 | 0.34 | |
| Chemicals only | Chlorinated ferrous sulphate. | 1,000 | Fe''' | 100 | 100 | 100 | 100 | 100 | do | 1/4 | 29.2 | 0.34 | |
| Freezing only | None | | | 93 | 78 | 69 | 62 | 54 | 6 min | 3/8 | 25.3 | 4.9 | 374 |
| Freezing + Chemical | Chlorinated ferrous sulphate. | 100 | Fe''' | 94 | 88 | 81 | 69 | 61 | 4 min | 3/8 | 27.1 | 7.4 | 332 |
| Do | do | 200 | Fe''' | 92 | 80 | 74 | 65 | 60 | 3 min | 3/8 | 28.6 | 9.8 | 308 |
| Do | do | 500 | Fe''' | 88 | 80 | 76 | 73 | 70 | 30 sec | 3/8 | 29.1 | 59 | 255 |
| Do | do | 1,000 | Fe''' | 88 | 81 | 78 | 73 | 72 | 10 sec | 3/8 | 32.2 | 177 | 242 | of 20" diameter. The base of the funnel was made from ⅜" steel plate perforated with ⅜" holes, the steel plate being bolted to the flange of the pipe. Below the steel plate the filter-flask was formed as a vacuum compartment provided with a drain cock and with a wide-bore cock communicating with a suction pump. The filter medium used was a standard woollen filter cloth.

The conditioning chemicals, where used were added after the sludge had been cooled almost to freezing point, the sludge being then thoroughly agitated to ensure distribution of the chemicals. The period of freezing was about thirty minutes after which the sludge was thawed. The settlement and filtration data were then obtained by methods similar to those described in relation to Tables 1, 2 and 3. Table 4 also gives the oxygen demand of the filtrate.

The quantity of digested sludge treated in each instance was either 9 or 12 litres.

TABLE 4
Digested sludge

| Chemical used | Concentration of chemical | | Settlement, Percent Volume occupied by sludge | | | | | | | Filtration Time, Secs. | Filtration | | | Oxygen absorbed from permanganate in 4 hrs. at 80° F., p. p. m. | |
|---|---|---|---|---|---|---|---|---|---|---|---|---|---|---|---|
| | | | Minutes | | | | | | | | Filter Cake | | Rate | | |
| | p. p. m. | Estimated as— | 5 | 10 | 15 | 20 | 25 | 30 | 60 | | Thickness, Inches | Percent Dry Solids | lbs./sq. ft./hr. | Decanted supernatant | Filtrate |
| Chlorine | 250 | Cl | 90 | 81 | 73 | 65 | 57 | 51 | 45 | 180 | ⁵⁄₁₆ | 22.0 | 14 | 177 | 146 |
| Do | 1,000 | Cl | 84 | 70 | 58 | 51 | 47 | 44 | 38 | 75 | ¼ | 24.8 | 33 | 181 | 154 |
| Chlorinated ferrous sulphate | 250 | Fe''' | 86 | 73 | 61 | 51 | 48 | 46 | 41 | 80 | ¼ | 26.9 | 31 | 166 | 148 |
| Do | 500 | Fe''' | 85 | 73 | 62 | 51 | 47 | 44 | 38 | 60 | ¼ | 26.5 | 42 | 166 | 132 |
| Do | 1,000 | Fe''' | 76 | 57 | 48 | 44 | 42 | 41 | 39 | 10 | ¼ | 27.8 | 251 | 97 | 124 |
| Aluminium sulphate | 100 | Al | 83 | 68 | 56 | 53 | 51 | 48 | 44 | 180 | ⁵⁄₁₆ | 26.9 | 9 | 195 | 136 |
| Do | 200 | Al | 82 | 62 | 56 | 54 | 52 | 50 | 47 | 60 | ⁵⁄₁₆ | 25.6 | 27 | 181 | 125 |
| Do | 500 | Al | 71 | 51 | 47 | 46 | 45 | 44 | 42 | 5 | ¼ | 28.6 | 321 | 198 | 178 |
| None (Freezing only) | | | 91 | 82 | 75 | 65 | 56 | 54 | 45 | 360 | ⁵⁄₁₆ | 23.6 | 7 | 183 | 158 |

In carrying out the process of the invention the latent heat of fusion of ice is utilised so that the energy required to thaw one container full of sludge is obtained by the extraction of heat from the unfrozen sludge in the other container, which is thus frozen; thus the refrigeration apparatus may, according to one construction consist essentially of a compressor, evaporator, and condenser coils, an expansion or regulator valve, and means for reversing the flow of the refrigerant through the apparatus so that the evaporator coils become the condenser coils and the condenser coils the evaporator coils. Methyl chloride may advantageously be used as the refrigerant.

The condenser and evaporator coils of the apparatus, connected, for example, by a reversible expansion or regulator valve, are mounted within two separate containers for the sludge to be treated according to the process of the invention, both containers having a sludge inlet and a sludge outlet. A compressor is provided which is adapted by the inclusion of control valves to cause the reversal of flow of the refrigerant as between condenser and evaporator.

The operation cycle is as follows:

The compressor operates to evaporate the refrigerant and freeze the sludge in one container, the heat withdrawn serving to thaw the sludge on the condenser side, which thawed sludge is then rejected and replaced by sludge at the normal inlet temperature. The condenser side is then under pressure with the refrigerant liquefied.

The flow of refrigerant is now reversed to cause its evaporation on the condenser side, and freeze the sludge; the heat withdrawn is absorbed as the latent heat of fusion of ice, the temperature remaining at or below freezing point as long as any ice is left, and until all the sludge is thawed after which there is a slight rise in temperature. The sludge is then run off for settlement, and is replaced by fresh sludge at about the same temperature. During the thawing operation in the condenser side freezing has occurred on the evaporator side. The flow of refrigerant is again reversed, and the latent heat of fusion of ice again used to cool and condense the refrigerant. The thawed out sludge is settled and/or filtered to produce a filter cake which if required may be subjected to further drying, the supernatant being passed to waste.

The accompanying drawing represents the circuit diagram of a refrigerating apparatus which was used according to the process of the invention to freeze the digested sludges of which the settlement and filtration data have been given in Table 4.

In the drawing, numerals 1 to 8 represent valves. When the apparatus is first brought into service, valves 1, 3, 5 and 7 are opened and valves 2, 4, 6 and 8 are closed. The compressor A delivers hot compressed refrigerant gas through line 10, valve 1, and line 11 to the inlet G of coils submerged in the sludge contained in sludge pan II. The hot refrigerant gas then passes from the coil through opening D line 12, valve 5 and line 13 to an auxiliary water-cooled condenser F. During this initial stage of the operation, the refrigerant is liquefied entirely by the cooling water which flows through the condenser F, the water entering the condenser by the line 14 and leaving by the line 15.

The refrigerant, now liquefied, leaves the condenser F and passes by the line 16 through a thermostatic regulator H, valve 7 and line 17 to the inlet J of coils submerged in the sludge contained in sludge pan I. The thermostatic regulator H is connected to and controlled by a regulator bulb R placed in the line 19 through which the refrigerant passes back to the compressor A. The inlet J of the coils submerged in the sludge pan I is formed as an expansion valve. Here the liquefied refrigerant is evaporated, the coils in sludge pan I during this stage of operation thus functioning as evaporator coils. Evaporation of the refrigerant abstracts heat from the sludge in sludge pan I and the sludge is thereby frozen. The evaporated refrigerant leaves the coils in sludge pan I through the outlet K and passes back by line 18, valve 3 and line 19 to the compressor A.

At this stage, the sludge in sludge pan II which has been heated by the hot refrigerant gas from the compressor, is discharged and replaced by fresh sludge at the ordinary temperature. When this initial stage of the operation has been completed, the frozen sludge is thereafter used to cool and liquefy the greater part of the hot refrigerant gas from the compressor. This is accomplished by reversing the flow of the refrigerant through the coils of the sludge pans.

For reversal of the flow of the refrigerant through the coils, valves 1, 3, 5 and 7 are closed and valves 2, 4, 6 and 8 are opened. Hot compressed refrigerant gas now passes from the compressor A, through line 10, valve 2 and line 18, to the inlet K of the coils in sludge pan I, which coils are now used as condenser coils. Here the hot refrigerant gas is cooled and liquefied at a low temperature by the frozen sludge in sludge pan I, the heat extracted from the refrigerant being absorbed, as the latent heat of fusion of ice, by the sludge which is thereby melted.

The liquefied refrigerant leaves the coils of sludge pan I at the point J and passes by line 17, valve 6 and line 13 to the auxiliary condenser F which now operates as a refrigerant container. From the condenser F the liquefied refrigerant passes through the line 16 thermostatic regulator H of conventional type, valve 8, lines 20 and 12 to the opening D of the coils submerged in the sludge of sludge pan II. The coils in sludge pan II now function as evaporator coils. The liquefied refrigerant entering at D is evaporated and the sludge in sludge pan II is thereby frozen. The refrigerant gas from the evaporation leaves the coils at the point G and passes back by lines 11 and 21, valve 4 and line 19 to the compressor A.

In the course of this operating cycle, while the hot gas is being condensed in the coils of sludge pan I, the heat given out by the gas thaws the sludge, which is then ready for discharge for settlement and filtration. When the thawing is complete, the pressure rises in the hot gas system, in this instance in lines 10 and 18 and opens the pressure-operated water valve M, which is connected to line 10 in the hot gas system by the pressure pipe P. The auxiliary water-cooled condenser F then comes into operation, and thus completes the liquefaction of the refrigerant in the latter stages of the cycle.

When freezing is complete in sludge pan II the thawed sludge in sludge pan I is discharged and replaced by fresh sludge which is in its turn frozen by once more reversing the operating cycle, in this case by opening valves 1, 3, 5 and 7 and closing valves 2, 4, 6 and 8. These successive reversals with the coils in each of the two sludge pans being used alternately as condensing and evaporating coils to freeze and thaw the sludge in each of the sludge pans I and II alternately may be continued as long as required.

Thus, it is seen that when the apparatus is first put into operation the refrigerant is liquefied in an ordinary water-cooled condenser, but after freezing liquefaction is effected by utilising the latent heat of fusion of ice.

The refrigeration apparatus, the circuit diagram of which has been described, was powered by a ½ H. P. motor. The two sludge pans were shallow and each had a capacity of 60 lbs. The refrigerant used was methyl chloride, and the apparatus included such ancillary equipment as sight-glasses, temperature and pressure gauges, means for agitating the sludges in the sludge pans, and means for filling and draining the sludge pans.

Once the apparatus is in full operation, the auxiliary water-cooled condenser only comes into operation at a predetermined temperature after the frozen sludge has been thawed. This may be effected by a temperature-controlled water valve or, as in the circuit described above, by a pressure operated water-valve.

It is thus seen that the action of the freezing apparatus described is reversed by a system of valves, operated manually or automatically, which serve to reverse the direction of flow of the refrigerant after passing through the expansion or regulator valves H. On reversal, the frozen sludge in one pan is thawed by the heat abstracted during the freezing of sludge in the other pan. This method of freezing and thawing permits of a considerable lowering of the condensing temperature for as long as unmelted sludge remains in the condenser side of the refrigerating system. Moreover, it enables a considerable saving of power to be effected.

The results of five experiments, which show the saving of power and of water effected by the hereinbefore described method of freezing and thawing, are given in the following Table 5.

utilised as previously described. The results given in Table 5 clearly show the saving effected in power and water.

Thus, among the advantages of this method of freezing and thawing operation are:

(1) Reduction in power used. Table 5 shows reductions of from 10% to 25% in the electrical power used.

(2) Thawing effected without the addition of heat from an external source.

(3) Reduction in the volume of water which has to be pumped for condensation.

(4) The sludge is handled throughout the whole process in its liquid state.

With better heat transfer, the saving in electrical power could be further increased.

When the refrigerating apparatus was being designed, it was thought impracticable to construct it so that the evaporator and condenser coils would be immersed in the sludge as it was believed that the sludge would form a viscous non-conducting film around the coils, which film would be difficult or impossible to remove. It has been found, however, that this does not occur as the sludge, after freezing and thawing, settles out in a particulate condition.

It is believed that the physical character of the sludges is altered by the freezing so that their capacity for settlement is increased and their filtration facilitated. The solids concentration of the sludge is increased and if the sludge is filtered, the filter-cake obtained is of low water content, is friable, granular in structure, and readily responds to further drying.

We claim:

1. A process for the treatment of sludges, comprising adding to a sludge, just prior to reaching the freezing point, a sludge coagulating agent, freezing said sludge, thawing the frozen sludge, settling the thawed sludge and decanting supernatant liquid and filtering the settled sludge, said sludge coagulating agent being present in an amount at least 100 parts per million by weight of wet sludge.

2. A process as defined in claim 1, wherein the sludge coagulating agent is selected from the group, consisting of chlorine gas, chlorinated ferrous sulphate and aluminum sulphate.

3. A process as defined in claim 2, wherein the sludge coagulating agent is chlorine gas.

4. A process as defined in claim 2, wherein the sludge coagulating agent is chlorinated ferrous sulphate.

5. A process as defined in claim 2, wherein the sludge coagulating agent is aluminum sulphate.

References Cited in the file of this patent

UNITED STATES PATENTS

| | | |
|---|---|---|
| 1,915,240 | Putnam | June 20, 1933 |
| 1,980,244 | Wright | Nov. 13, 1934 |
| 2,075,224 | Porteous | Mar. 30, 1937 |
| 2,145,575 | Zwickl | Jan. 31, 1939 |
| 2,174,873 | Downes et al. | Oct. 3, 1939 |
| 2,276,814 | Zwickl | Mar. 17, 1942 |

TABLE 5

| Experiment | Material Frozen | With or without Latent heat condenser. | Time | K. W. H. used. | Percent saving of power | Water used in condenser gallons | Percent saving of water |
|---|---|---|---|---|---|---|---|
| 1 | Water | Without | 4 h. 25 m. | 1.99 | 11.5 | 115 | 53 |
|   |       | With    | 4 h. 25 m. | 1.76 |      | 54  |    |
| 2 | do    | Without | 3 h. 5 m.  | 1.39 | 10.1 | 38  | 71 |
|   |       | With    | 3 h. 0 m.  | 1.25 |      | 11  |    |
| 3 | Sludge| Without | 3 h. 10 m. | 1.59 | 11.9 | 64  | 36 |
|   |       | With    | 3 h. 20 m. | 1.40 |      | 41  |    |
| 4 | do    | Without | 2 h. 40 m. | 1.20 | 19.2 | 46  | 46 |
|   |       | With    | 2 h. 20 m. | 0.97 |      | 25  |    |
| 5 | do    | Without | 4 h. 50 m. | 2.26 | 25.7 | 63  | 19 |
|   |       | With    | 4 h. 00 m. | 1.68 |      | 51  |    |

Each pair in this series was frozen in sequence, using the same quantity and under the same external conditions.

Each of the five experiments consisted of two tests. In the first of the two tests a certain quantity of material was frozen in the ordinary manner, without using the latent heat of fusion of ice as previously described. In the second of the two tests, an equal quantity of the same material was frozen under the same external conditions as prevailed in the first test, but with the difference that in the second test the latent heat of fusion of ice was

OTHER REFERENCES

Yancey et al.: Flocculation as an Aid in the Clarification of Coal Washery Water, Department of Interior Booklet R. I. 3494, February 1940.

Keefer: "Sewage Treatment Works" (1940), pub. McGraw-Hill Book Co., Inc., page 422 cited.

Transactions of the ASCE, vol. III, 1946, pp. 635–678.